W. ROBINSON.
Vegetable Cutter.
No. 18,929.
Patented Dec. 22, 1857.
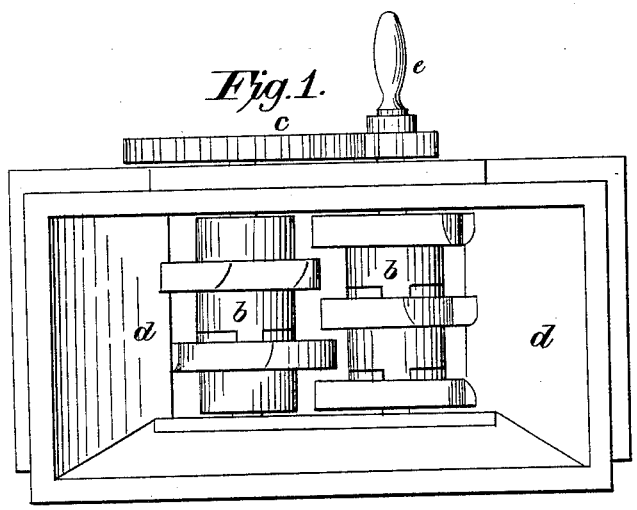
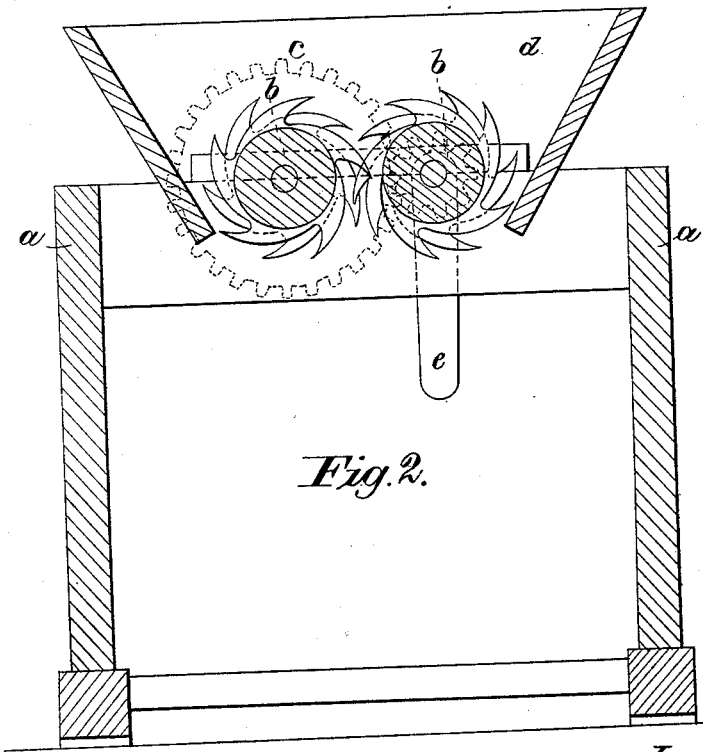
Inventor;
Wm Robinson

UNITED STATES PATENT OFFICE.

WM. ROBINSON, OF HIGHGATE, VERMONT.

VEGETABLE-CUTTER.

Specification of Letters Patent No. 18,929, dated December 22, 1857.

*To all whom it may concern:*

Be it known that I, WILLIAM ROBINSON, of Highgate, in the county of Franklin and State of Vermont, have invented a new and useful Machine for Preparing Vegetable Roots for Feeding Animals and other Like Purposes; and I do hereby declare and ascertain said invention, referring to the accompanying drawing, in which—

Figure 1, is a vertical section; Fig. 2, is a plan of the rollers, &c.

My invention consists in employing a pair of rollers or cylinders, upon each of which there are annular rows of hooks or hook formed teeth hereafter described with annular spaces between. One of said rollers or cylinders is made to revolve faster than the other and both turn inward by which a peculiar action is produced upon the vegetables, breaking and tearing them in pieces instead of slicing as is generally done in vegetable cutters.

The construction is as follows: On a suitable frame $a$, $a$, two cylinders $b$ are situated; these I have made three inches in diameter and six inches long, but of course other proportions will answer; at certain intervals around each cylinder I project from its periphery hook formed teeth which come to a flat sharp edge at their outer points, the configuration being clearly shown in the two figures of the drawing; the hooks on the two cylinders turn toward each other in the direction of the revolution; on one cylinder axis there is a spur wheel $c$ that gears into a pinion on the axis of the other cylinder outside the frame so that the one cylinder turns three more or less times to the others once; the result of this is that any proper article thrown into the hopper $d$ that surrounds the cylinders will be seized and drawn gradually in by the action of one cylinder while the other is tearing pieces off from it till the whole is reduced to a proper state for feeding to cattle or other animals.

The cylinders may be turned by a hand crank $e$ on the axis of one of the cylinders or by any other power convenient.

The position of the cylinders is horizontal and the hooks on one cylinder alternate with those of the other interlocking and passing by each other as shown, but their edges do not touch the opposite cylinder and are not in that way drilled or broken.

Having thus described my invention what I claim therein as new and for which I desire to secure Letters Patent is—

The employment of hooked cutters running at different velocities on parallel cylinders, the whole being arranged and combined in the manner and for the purposes set forth.

WM. ROBINSON.

Witnesses:
WM. M. MARTIN,
E. C. THOMPSON.